United States Patent
Shears et al.

(10) Patent No.: US 7,086,390 B2
(45) Date of Patent: Aug. 8, 2006

(54) INTEGRATED FUEL TANK AND VAPOR CONTAINMENT SYSTEM

(75) Inventors: Peter D. Shears, Wauwatosa, WI (US); John Gulke, Fond du Lac, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 10/981,894

(22) Filed: Nov. 5, 2004

(65) Prior Publication Data

US 2006/0096583 A1    May 11, 2006

(51) Int. Cl.
*F02M 33/02* (2006.01)

(52) U.S. Cl. .................................. 123/518; 123/519
(58) Field of Classification Search ............. 123/518, 123/519, 520, 516
See application file for complete search history.

(56) References Cited

U.S. PATENT DOCUMENTS

| | | |
|---|---|---|
| 1,499,864 A | 7/1924 | Gordon |
| 2,358,840 A | 9/1944 | Walker |
| 2,520,124 A | 8/1950 | Chaney et al. |
| 2,553,763 A | 5/1951 | Hammon |
| 2,822,059 A | 2/1958 | Lunn et al. |
| 2,966,960 A | 1/1961 | Rochlin |
| 3,221,724 A | 12/1965 | Wentworth |
| 3,352,294 A | 11/1967 | Biller et al. |
| 3,368,326 A | 2/1968 | Hervert |
| 3,372,679 A * | 3/1968 | Aitken .................. 123/519 |
| 3,391,679 A | 7/1968 | Williams et al. |
| 3,406,501 A | 10/1968 | Watkins |
| 3,456,635 A | 7/1969 | Hervert |
| 3,477,210 A | 11/1969 | Hervert |
| 3,541,765 A | 11/1970 | Adler et al. |
| 3,572,013 A | 3/1971 | Hansen |
| 3,572,014 A | 3/1971 | Hansen |
| 3,610,220 A | 10/1971 | Yamada |
| 3,610,221 A | 10/1971 | Stoltman |
| 3,617,034 A | 11/1971 | Skinner |
| 3,645,244 A | 2/1972 | Seyfarth |
| 3,646,731 A | 3/1972 | Hansen |

(Continued)

FOREIGN PATENT DOCUMENTS

DE        4304180        8/1993

(Continued)

OTHER PUBLICATIONS

George A. Lavoie et al., "A Fuel Vapor Model (FVSMOD) for Evaporative Emissions System Design and Analysis," 1998 Society of Automotive Engineers, Inc.

(Continued)

*Primary Examiner*—Thomas Moulis
(74) *Attorney, Agent, or Firm*—Michael Best & Friedrich LLP (57) ABSTRACT

A fuel tank for an engine that includes an air cleaner assembly and an air-fuel mixing device. The fuel tank includes a first tank portion, a second tank portion connected to the first tank portion to define a fuel chamber, and a canister at least partially formed as part of the first tank portion. A first flow path is at least partially formed as part of the first tank portion. The first flow path provides fluid communication between the fuel chamber and the canister. A second flow path is at least partially formed as part of the first tank portion to provide fluid communication between the canister and at least one of the air-fuel mixing device and the air cleaner assembly.

38 Claims, 13 Drawing Sheets

U.S. PATENT DOCUMENTS

| | | | |
|---|---|---|---|
| 3,650,256 A | 3/1972 | Marshall | |
| 3,665,906 A | 5/1972 | De Palma | |
| 3,675,634 A | 7/1972 | Tatsutomi | |
| 3,678,663 A | 7/1972 | Hansen | |
| 3,681,899 A | 8/1972 | Grote | |
| 3,696,799 A | 10/1972 | Gauck | |
| 3,721,072 A | 3/1973 | Clapham | |
| 3,747,303 A | 7/1973 | Jordan | |
| 3,757,753 A * | 9/1973 | Hunt | 123/519 |
| 3,759,234 A | 9/1973 | Buckton et al. | |
| 3,849,093 A | 11/1974 | Konishi et al. | |
| 3,913,545 A | 10/1975 | Haase et al. | |
| 3,990,419 A | 11/1976 | Itakura | |
| 4,112,898 A | 9/1978 | Takimoto et al. | |
| 4,127,097 A | 11/1978 | Takimoto | |
| 4,175,526 A | 11/1979 | Phelan | |
| 4,259,096 A | 3/1981 | Nakamura et al. | |
| 4,261,717 A | 4/1981 | Belore et al. | |
| 4,279,233 A | 7/1981 | Tobita et al. | |
| 4,279,630 A | 7/1981 | Nakamura et al. | |
| 4,280,360 A | 7/1981 | Kobayashi et al. | |
| 4,375,204 A | 3/1983 | Yamamoto | |
| 4,415,344 A | 11/1983 | Frost et al. | |
| 4,418,662 A | 12/1983 | Engler et al. | |
| 4,446,838 A | 5/1984 | Suzuki et al. | |
| 4,475,522 A | 10/1984 | Oonaka | |
| 4,629,479 A | 12/1986 | Cantoni | |
| 4,631,077 A | 12/1986 | Spicer et al. | |
| 4,631,952 A | 12/1986 | Donaghey | |
| 4,658,795 A | 4/1987 | Kawashima et al. | |
| 4,684,382 A | 8/1987 | Abu-Isa | |
| 4,684,510 A | 8/1987 | Harkins | |
| 4,705,007 A | 11/1987 | Plapp et al. | |
| 4,747,388 A | 5/1988 | Tuckey | |
| 4,758,460 A | 7/1988 | Spicer et al. | |
| 4,852,761 A | 8/1989 | Turner et al. | |
| 4,919,103 A * | 4/1990 | Ishiguro et al. | 123/514 |
| 4,938,787 A | 7/1990 | Simmerlein-Erlbacher | |
| 5,215,132 A | 6/1993 | Kobayashi | |
| 5,221,573 A | 6/1993 | Baigas, Jr. | |
| 5,259,412 A | 11/1993 | Scott et al. | |
| 5,261,439 A | 11/1993 | Harris | |
| 5,301,829 A | 4/1994 | Chrisco | |
| 5,313,977 A | 5/1994 | Bergsma et al. | |
| 5,313,978 A | 5/1994 | Takaki | |
| 5,326,514 A | 7/1994 | Linden et al. | |
| 5,338,253 A | 8/1994 | Damsohn et al. | |
| 5,350,444 A | 9/1994 | Gould et al. | |
| 5,408,977 A | 4/1995 | Cotton | |
| 5,437,701 A | 8/1995 | Townsley | |
| 5,453,118 A | 9/1995 | Heiligman | |
| 5,478,379 A | 12/1995 | Bevins | |
| 5,560,345 A | 10/1996 | Geyer et al. | |
| 5,562,084 A | 10/1996 | Shimamura | |
| 5,566,705 A | 10/1996 | Harris | |
| 5,573,811 A | 11/1996 | Townsley | |
| 5,623,911 A | 4/1997 | Kiyomiya et al. | |
| 5,638,786 A | 6/1997 | Gimby | |
| 5,704,337 A | 1/1998 | Stratz et al. | |
| 5,727,531 A | 3/1998 | Osanai | |
| 5,762,692 A | 6/1998 | Dumas et al. | |
| 5,798,270 A | 8/1998 | Adamczyk, Jr. et al. | |
| 5,809,976 A | 9/1998 | Cook | |
| 5,871,569 A | 2/1999 | Oehler et al. | |
| 5,875,768 A | 3/1999 | Schenk et al. | |
| 5,878,729 A | 3/1999 | Covert et al. | |
| 5,891,207 A | 4/1999 | Katta | |
| 5,898,107 A | 4/1999 | Schenk | |
| 5,901,689 A * | 5/1999 | Kimura et al. | 123/518 |
| 5,912,368 A | 6/1999 | Satarino et al. | |
| 5,935,398 A | 8/1999 | Taniguchi et al. | |
| 6,102,085 A | 8/2000 | Nanaji | |
| 6,105,708 A * | 8/2000 | Amano et al. | 180/309 |
| 6,136,075 A | 10/2000 | Bragg et al. | |
| 6,152,996 A | 11/2000 | Linnersten et al. | |
| 6,156,089 A | 12/2000 | Stemmer et al. | |
| 6,182,693 B1 * | 2/2001 | Stack et al. | 137/565.17 |
| 6,189,516 B1 | 2/2001 | Hei Ma | |
| 6,231,646 B1 | 5/2001 | Schweizer et al. | |
| 6,269,802 B1 | 8/2001 | Denis et al. | |
| 6,273,070 B1 | 8/2001 | Arnal et al. | |
| 6,302,144 B1 | 10/2001 | Graham et al. | |
| 6,330,879 B1 | 12/2001 | Kitamura et al. | |
| 6,354,280 B1 | 3/2002 | Itakura et al. | |
| 6,367,458 B1 | 4/2002 | Furusho et al. | |
| 6,390,074 B1 | 5/2002 | Rothamel et al. | |
| 6,463,915 B1 | 10/2002 | Ozaki et al. | |
| 6,464,761 B1 | 10/2002 | Bugli | |
| 6,505,610 B1 | 1/2003 | Everingham et al. | |
| 6,591,866 B1 | 7/2003 | Distelhoff et al. | |
| 6,675,780 B1 | 1/2004 | Wendels et al. | |
| 6,692,551 B1 | 2/2004 | Wernholm et al. | |
| 6,692,555 B1 | 2/2004 | Oda et al. | |
| 6,699,310 B1 | 3/2004 | Oda et al. | |
| 6,729,312 B1 | 5/2004 | Furushou | |
| 6,729,319 B1 | 5/2004 | Mitsutani | |
| 6,736,871 B1 | 5/2004 | Green et al. | |
| 6,758,885 B1 | 7/2004 | Leffel et al. | |
| 6,772,740 B1 | 8/2004 | Kojima et al. | |
| 6,779,512 B1 | 8/2004 | Mitsutani | |
| 6,786,207 B1 | 9/2004 | Kojima et al. | |
| 6,863,082 B1 | 2/2005 | McIntosh et al. | |
| 6,874,484 B1 | 4/2005 | Benjey | |
| 6,874,485 B1 | 4/2005 | Fujimoto | |
| 6,877,488 B1 | 4/2005 | Washeleski | |
| 6,892,711 B1 | 5/2005 | Belanger, Jr. et al. | |
| 6,959,696 B1 | 11/2005 | Shears et al. | |
| 6,976,477 B1 | 12/2005 | Gimby et al. | |
| 2005/0178368 A1 * | 8/2005 | Donahue et al. | 123/520 |
| 2005/0284450 A1 | 12/2005 | Mills | |

FOREIGN PATENT DOCUMENTS

| | | |
|---|---|---|
| EP | 0 611896 | 8/1994 |
| EP | 1110593 | 6/2001 |
| GB | 2082935 | 3/1992 |
| JP | 54141916 | 11/1979 |
| JP | 0067960 | 4/1983 |

OTHER PUBLICATIONS

H. Bauer.-ed., "Gasoline-Engine Management," 1999, p. 152, Robert Bosch GmbH.

H. Bauer.-ed., "Gasoline Engine Management," 1999, p. 288-289, Robert Bosch GmbH.

H. Bauer.-ed., "Gasoline Engine Management," 1999, pp. 343-345, Robert Bosch GmbH.

"Automotive Fuel Lines," Verlag Moderne Industie, 1998, p. 4.

* cited by examiner

INTEGRATED FUEL TANK AND VAPOR CONTAINMENT SYSTEM

BACKGROUND

The present invention relates to a vapor containment system, and particularly to a vapor containment system that is at least partially formed as part of a fuel tank.

Internal combustion engines are often used to power small equipment such as lawnmowers, tillers, snow throwers, and the like. Typically, these engines include a fuel system that supplies fuel for combustion. The fuel system includes a tank, in which fuel is stored for use. Generally, the volatility of the fuel allows a portion of the fuel to evaporate and mix with air within the tank. Changes in temperature, such as those between evening and daytime, as well as sloshing during use can cause an increase or a decrease in the amount of fuel vapor in the tank as well as an increase or a decrease in the pressure within the tank.

To accommodate these pressure changes, fuel tanks often include a vent such as a vented fuel cap. The vent allows the excess air and fuel vapor to escape the tank when the pressure increases, and also allows air to enter the tank when the pressure drops. Pressure within the fuel tank typically drops as fuel is drawn from the tank for use. However, the escape of fuel vapor reduces the fuel efficiency of the engine.

SUMMARY

The invention provides a fuel tank for an engine that includes an air cleaner assembly and an air-fuel mixing device. The fuel tank includes a first tank portion, a second tank portion connected to the first tank portion to define a fuel chamber, and a canister at least partially formed as part of the first tank portion. A first flow path is at least partially formed as part of the first tank portion. The first flow path provides fluid communication between the fuel chamber and the canister. A second flow path is at least partially formed as part of the first tank portion to provide fluid communication between the canister and at least one of the air-fuel mixing device and the air cleaner assembly.

The invention also provides an engine that includes a combustion chamber operable to combust an air-fuel mixture and an air-fuel mixing device operable to deliver the air-fuel mixture to the combustion chamber. An air cleaner assembly is operable to deliver air to the air-fuel mixing device. A fuel tank includes a wall having a top portion. The wall defines a fuel chamber. A valve chamber is in fluid communication with the fuel chamber and a canister is at least partially formed as part of the wall and is in fluid communication with the valve chamber. A purge passageway is at least partially formed as part of the wall to provide fluid communication between the canister and the air-fuel mixing device, and a vent passageway is at least partially formed as part of the wall to provide fluid communication between the canister and the air cleaner assembly.

The invention also provides a fuel tank for an engine that includes an air cleaner assembly and an air-fuel mixing device. The fuel tank includes a wall having a top portion. The wall defines a fuel chamber. A valve chamber is at least partially formed as part of the wall and a first fluid communication path is at least partially formed as part of the wall to provide fluid communication between the fuel chamber and the valve chamber. A canister at least partially defines a canister space, and a second fluid communication path is positioned to provide fluid communication between the valve chamber and the canister space. A third fluid communication path is at least partially formed as part of the wall to provide fluid communication between the canister space and the air-fuel mixing device. A fourth fluid communication path is at least partially formed as part of the wall to provide fluid communication between the canister space and the air cleaner assembly.

BRIEF DESCRIPTION OF THE DRAWINGS

The detailed description particularly refers to the accompanying figures in which.

DETAILED DESCRIPTION

Figure 1:
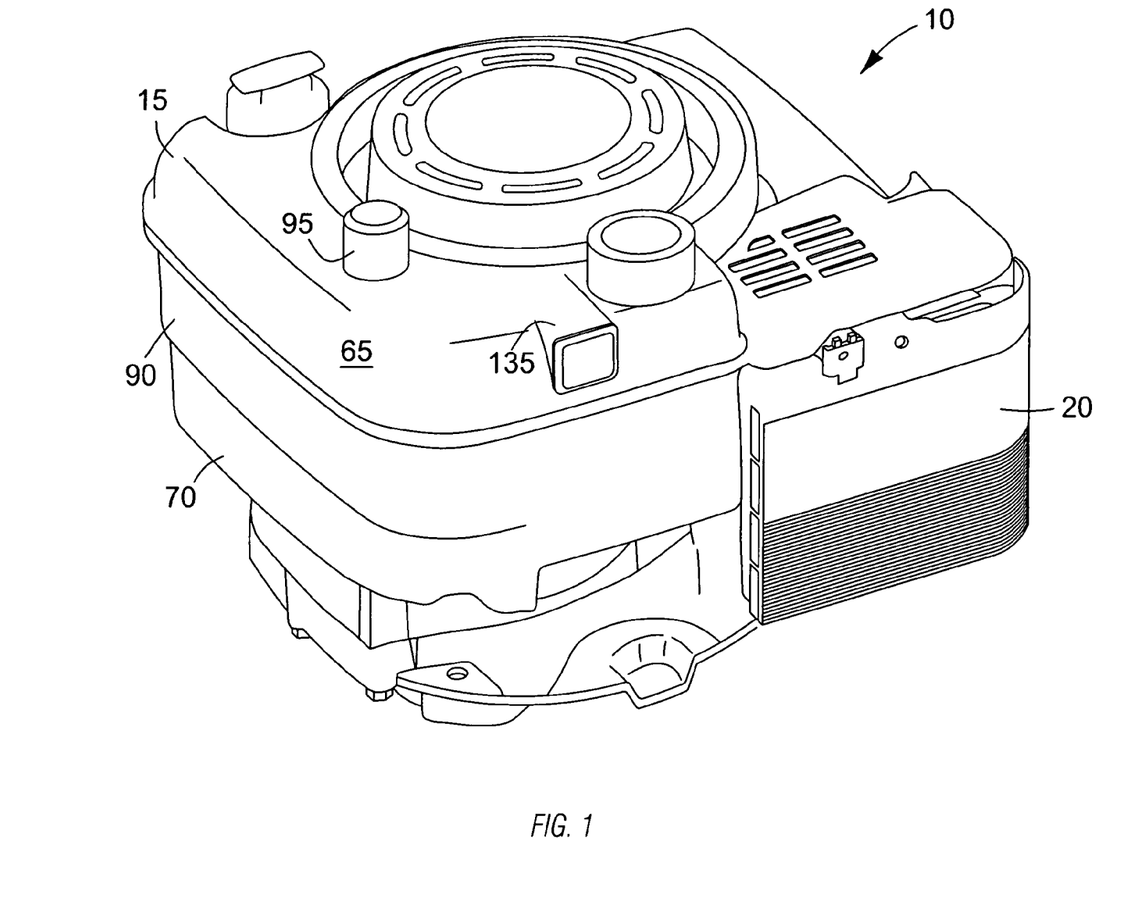
FIG. 1 is a perspective view of an engine including a fuel tank.

With reference to FIG. 1, an engine 10 including a fuel tank 15, an air cleaner assembly 20, and an air-fuel mixing device, such as a carburetor 25 (shown in FIG. 2) is illustrated. Engines 10 of this type are often used to power small equipment such as lawnmowers, garden tractors, snow throwers, tillers, pressure washers, generators, and the like. While the illustrated engine 10 is a small engine (e.g., two or fewer cylinders), it should be understood that the invention will function with other types of engines including large internal combustion engines.

The air cleaner assembly 20 receives a flow of air from the atmosphere and filters that air for delivery to the engine 10. Generally, a pleated paper filter media 30 is disposed within the air cleaner assembly 20 to filter unwanted particles form the air before the air is delivered to the air-fuel mixing device 25. Thus, the air cleaner assembly 20 defines a clean air space 35 where filtered air exits the filter media 30.

The carburetor 25 could be a float carburetor, a diaphragm carburetor or any other type of carburetor. The carburetor 25, illustrated in FIG. 2, includes a throttle plate (not shown) and a throat or venturi. The throttle plate controls the quantity of air that passes through the carburetor 25. As the air passes through the throat, fuel is drawn into the air stream and mixed with the air to produce a combustible air-fuel mixture. The air-fuel mixture is delivered to a combustion chamber 50 and combusted to produce usable power. A flow path may exist between the carburetor 25 and the combustion chamber 50. This flow path, if present, should be considered part of the carburetor 25.

The engine 10 includes one or more pistons 55 (shown schematically in FIGS. 9–11) that reciprocate within one or more cylinders 60 to define one or more combustion chambers 50. The illustrated engine 10 includes a single piston 55 that reciprocates within a single cylinder 60 to define a single combustion chamber 50. A spark ignites the air-fuel mixture within the combustion chamber 50 to produce useable shaft power at a crankshaft. Other types of engines (e.g., rotary engines, diesel engines, etc.) may define the combustion chamber in a different manner, or may ignite the air-fuel mixture in a different manner to produce the useable shaft power. In addition, other air-fuel mixing systems, including fuel injection, may be employed to deliver fuel and air to the combustion chamber 50.

Figure 3:
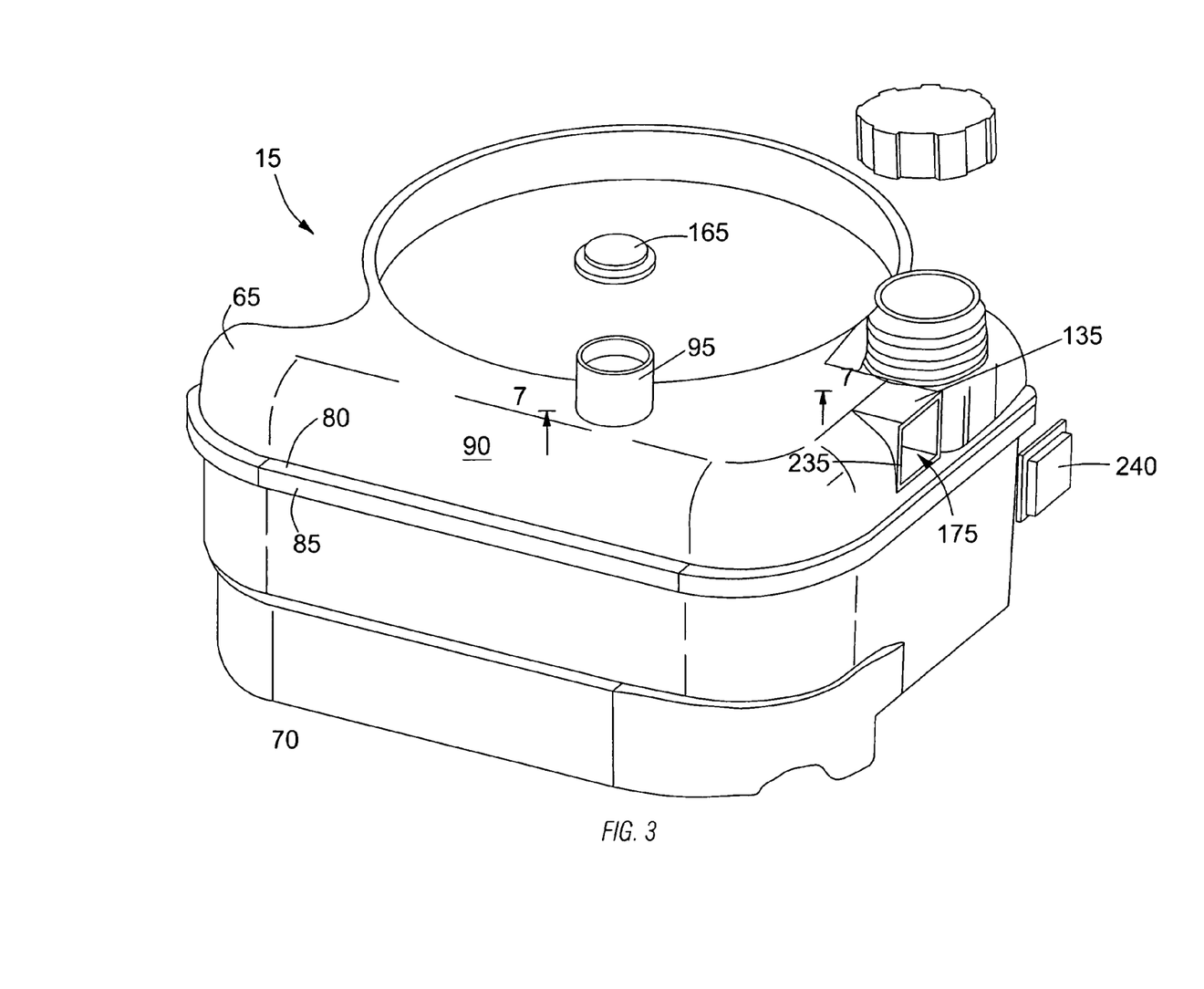
FIG. 3 is an exploded perspective view of the fuel tank of FIG. 1.
Figure 6:
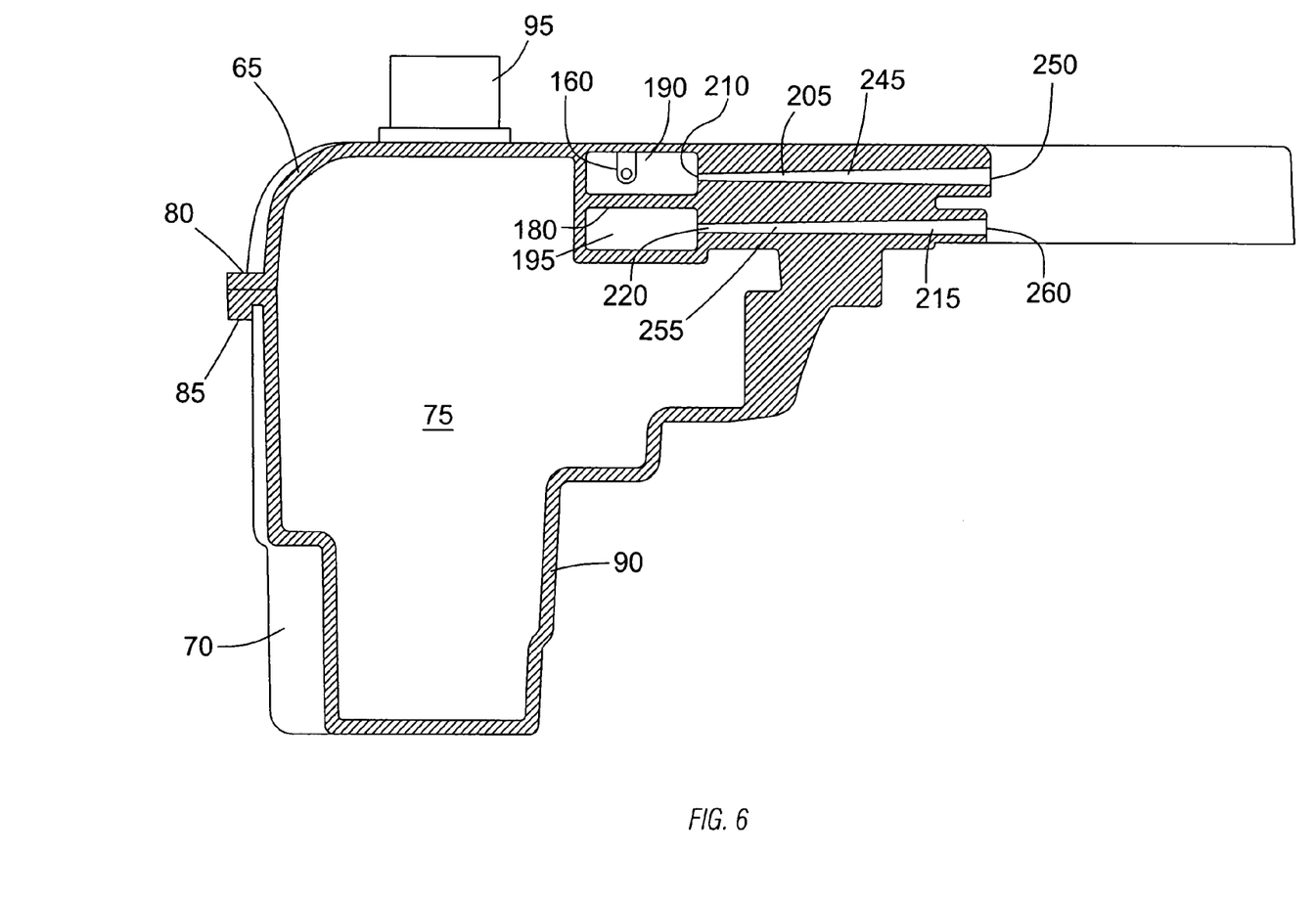
FIG. 6 is a section view the fuel tank of FIG. 4 taken along line 6—6 of FIG. 2.

With reference to FIG. 3, the fuel tank 15 includes a first tank portion 65 and a second tank portion 70 that attach to one another to define a fuel chamber 75 (shown in FIG. 6). The fuel chamber 75 receives and stores fuel for eventual use by the engine 10. The first tank portion 65 includes an attachment lip 80 that extends around the perimeter of the first tank portion 65. The second tank portion 70 includes a corresponding attachment lip 85 that extends around the perimeter of the second tank portion 70 and engages with the attachment lip 80 of the first tank portion 65 to completely define a wall 90 of the tank 15. In most constructions, the first tank portion 65 and the second tank portion 70 are welded to one another at the attachment lips 80, 85. In other constructions, an adhesive is used to attach the first tank portion 65 to the second tank portion 70.

The first tank portion 65 and the second tank portion 70 are generally injection molded from a plastic material. However, other manufacturing processes (e.g., vacuum forming, drawings, stamping, roto-molding, blow molding, and the like) may also be used to form one or both of the first tank portion 65 and the second tank portion 70. In addition, other materials, such as metals, composites, and the like may be employed to form one or both of the first tank portion 65 and the second tank portion 70 if desired.

In still another construction, a one-piece tank is formed using a suitable manufacturing process (e.g., roto-molding, injection molding, and the like). The one-piece tank eliminates the assembly step of attaching the first tank portion 65 to the second tank portion 70.

With continued reference to FIG. 3, the first tank portion 65 includes a valve chamber 95 that extends above the first tank portion 65. At least a portion of the valve chamber 95 is integrally-formed as part of the wall 90. As shown in FIG. 3, the valve chamber 95 is a substantially cylindrical chamber that is open at its uppermost end. While the valve chamber 95 has been described as extending above the first tank portion 65, other constructions may include valve chambers 95 that extend below the level of the first tank portion 65, or that extend above and below the wall 90 of the first tank portion 65.

A valve 100 (shown schematically in FIGS. 7 and 8) is disposed within the valve chamber 95 and is operable to inhibit over-filling of the fuel tank, inhibit fuel spillage due to sloshing and splashing, and inhibit fuel spillage during high tilt angle (e.g., greater than about 30 degrees) or rollover conditions. The valve 100 also allows free airflow through the valve chamber 95 during normal operating conditions, as will be described with regard to FIGS. 9–11. Many commercially available valves are well suited to performing these functions.

Figure 4:
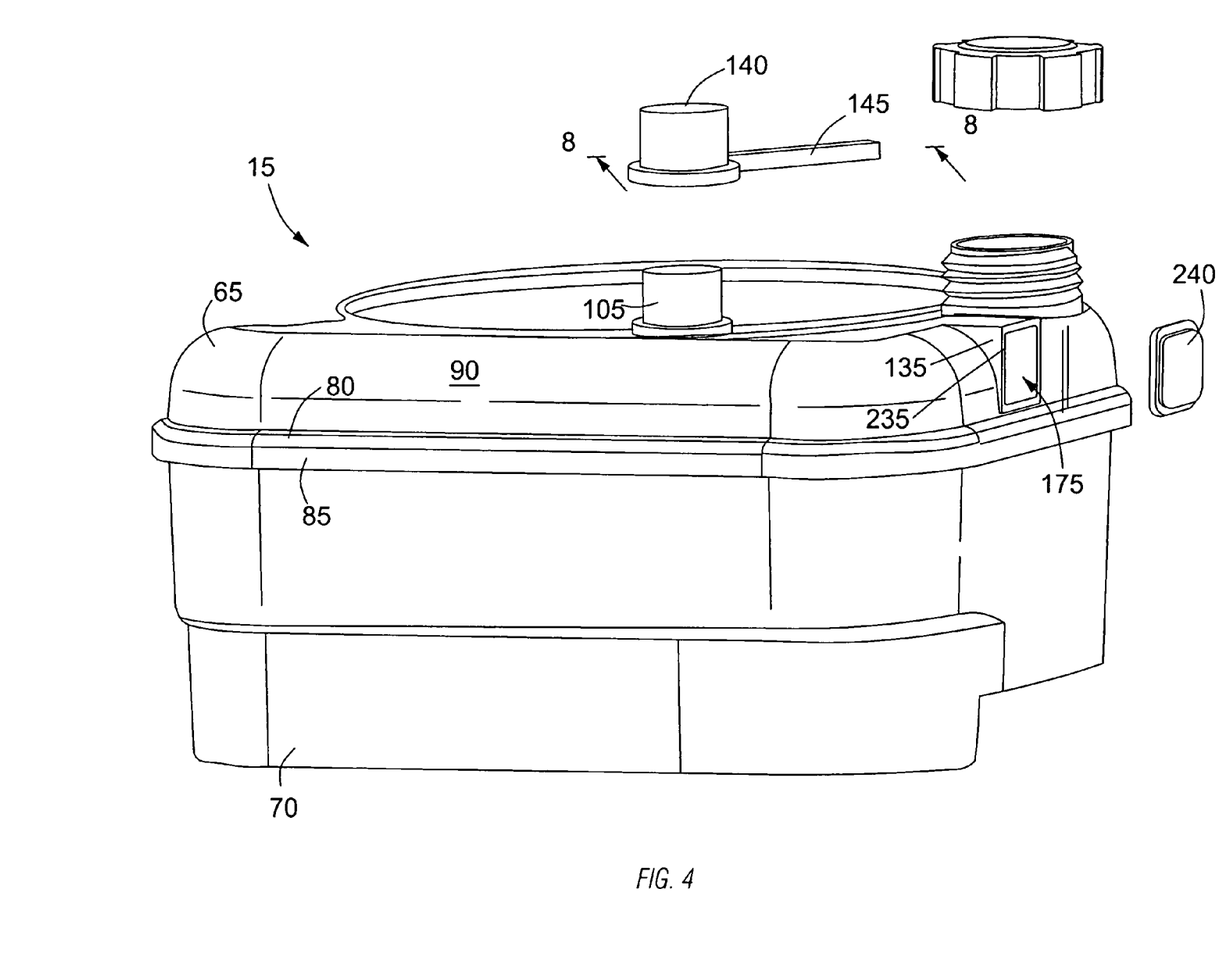
FIG. 4 is an exploded perspective view of another construction of a fuel tank.
Figure 7:
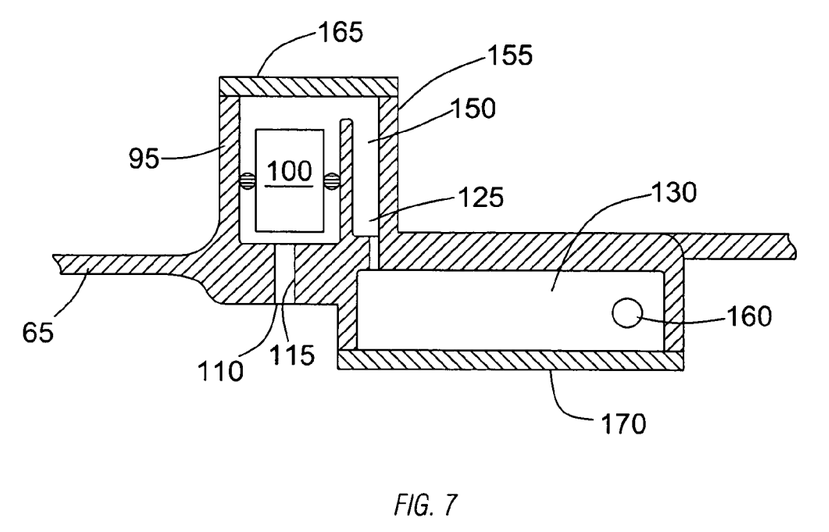
FIG. 7 is a sectional view of a portion of the fuel tank taken along line 7—7 of FIG. 3.
Figure 8:
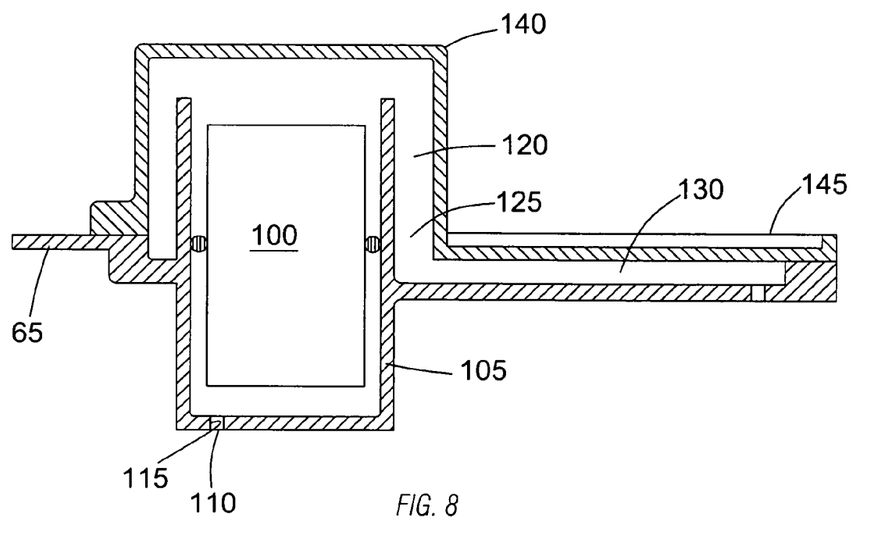
FIG. 8 is a sectional view of a portion of the fuel tank taken along line 8—8 of FIG. 4.

FIGS. 3 and 7 illustrate one valve chamber 95 that is suitable for use with the invention, while FIGS. 4 and 8 illustrate a second valve chamber 105 that is suitable for use with the invention. Of course other arrangements are possible and contemplated by the invention. The construction of FIGS. 4 and 8 includes the valve 100 disposed within the cylindrical valve chamber 105. A first flow path 110 is at least partially defined by an aperture 115 between the valve chamber 105 and the fuel chamber 75. The first flow path 110 allows for fluid communication between the valve chamber 105 and the fuel chamber 75. An annular chamber 120 surrounds the portion of the cylindrical valve chamber 105 disposed above the first tank portion 65 and defines a first end 125 of a second flow path 130. The second flow path 130 extends between the valve chamber 105 and a canister 135. A portion of the second flow path 130 is positioned on top of the top surface of the first tank portion 65 and is at least partially defined by the first tank portion 65. A cap 140 covers the portion of the valve chamber 105 that is disposed above the first tank portion 65. The cap 140 also includes an extension portion 145 that cooperates with the first tank portion 65 to enclose the second flow path 130 such that the second flow path 130 is open at the annular chamber 120 and at the canister 135 only. In most constructions, the cap 140 is welded or adhesively bonded to the first tank portion 65 to assure a substantially leak-free connection.

The arrangement of the valve chamber 95 illustrated in FIGS. 3 and 7 again includes the valve 100 disposed within the cylindrical valve chamber 95. A non-annular chamber 150 is disposed on one side of the valve chamber 95 and is partially defined by an outer wall 155 that is taller than the cylindrical valve chamber 95. The non-annular chamber 150 defines the first end 125 of the second flow path 130. A portion of the second flow path 130 is disposed beneath the top surface of the first tank portion 65 and is at least partially defined by the wall 90 of the first tank portion 65. A second end 160 of the second flow path 130 ends within the canister 135, as it does with the construction of FIGS. 4 and 8. A first cover 165 is welded or adhesively bonded to the wall 155 above the cylindrical valve chamber 95 to seal the chamber 95 and provide a flow path between the valve chamber 95 and the non-annular chamber 150. Thus, the second flow path 130 and the valve chamber 95 are in fluid communication. A second cover 170 is welded or adhesively bonded to the inside of the first tank portion 65 such that the second cover 170 and the first tank portion 65 cooperate to enclose the second flow path 130 between the non-annular chamber 150 and the canister 135.

While a non-annular chamber 150 has been shown and described, one of ordinary skill will realize that the actual shape of the chamber is not critical to the function of the invention. Thus, an annular chamber, a crescent-shaped chamber, or other shaped chambers could be employed if desired.

Figure 5:
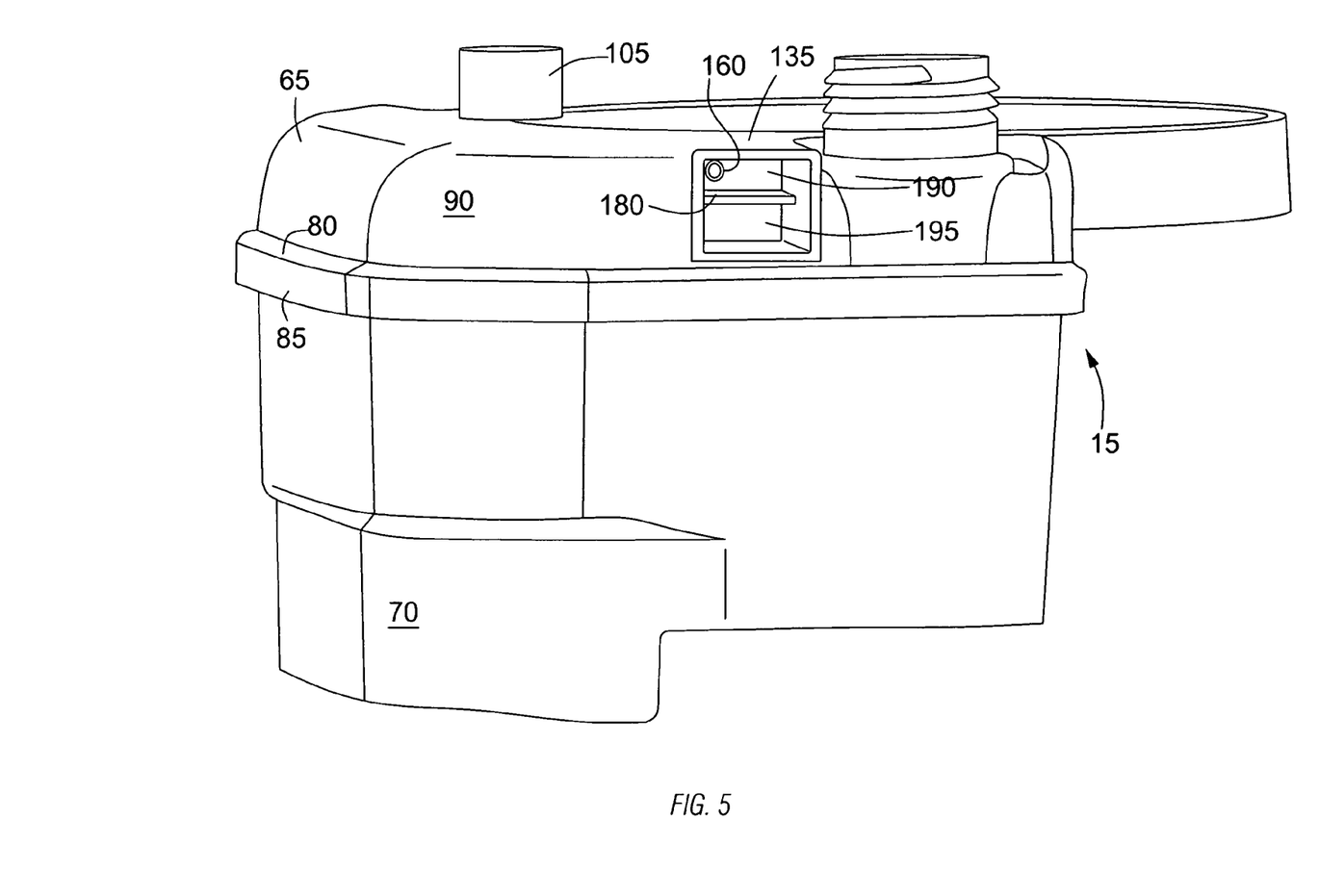
FIG. 5 is a perspective view of the fuel tank of FIG. 4.

The canister 135 is at least partially formed as part of the wall 90 of the fuel tank 15 and more specifically as part of the first tank portion 65. The canister 135, best illustrated in FIGS. 1 and 5, defines a canister space 175 that is separated by a central wall 180 into a U-shaped flow path 185 having a first leg 190 and a second leg 195. The first leg 190 of the U-shaped flow path 185 is disposed above the second leg 195, with other arrangements also being possible.

Figure 9:
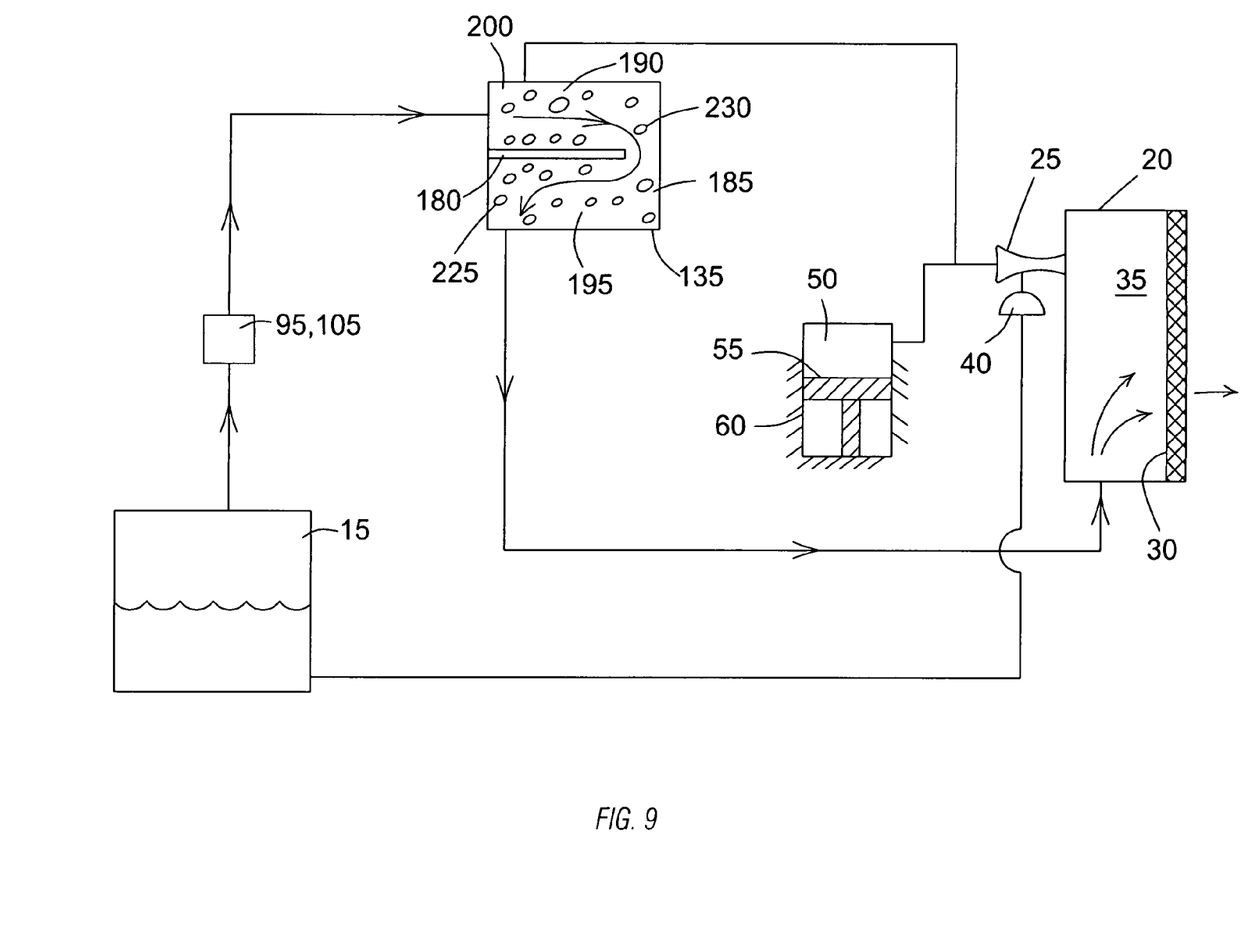
FIG. 9 is a schematic illustration of the vapor containment system during a pressure rise within the fuel tank when the engine is idle.
Figure 10:
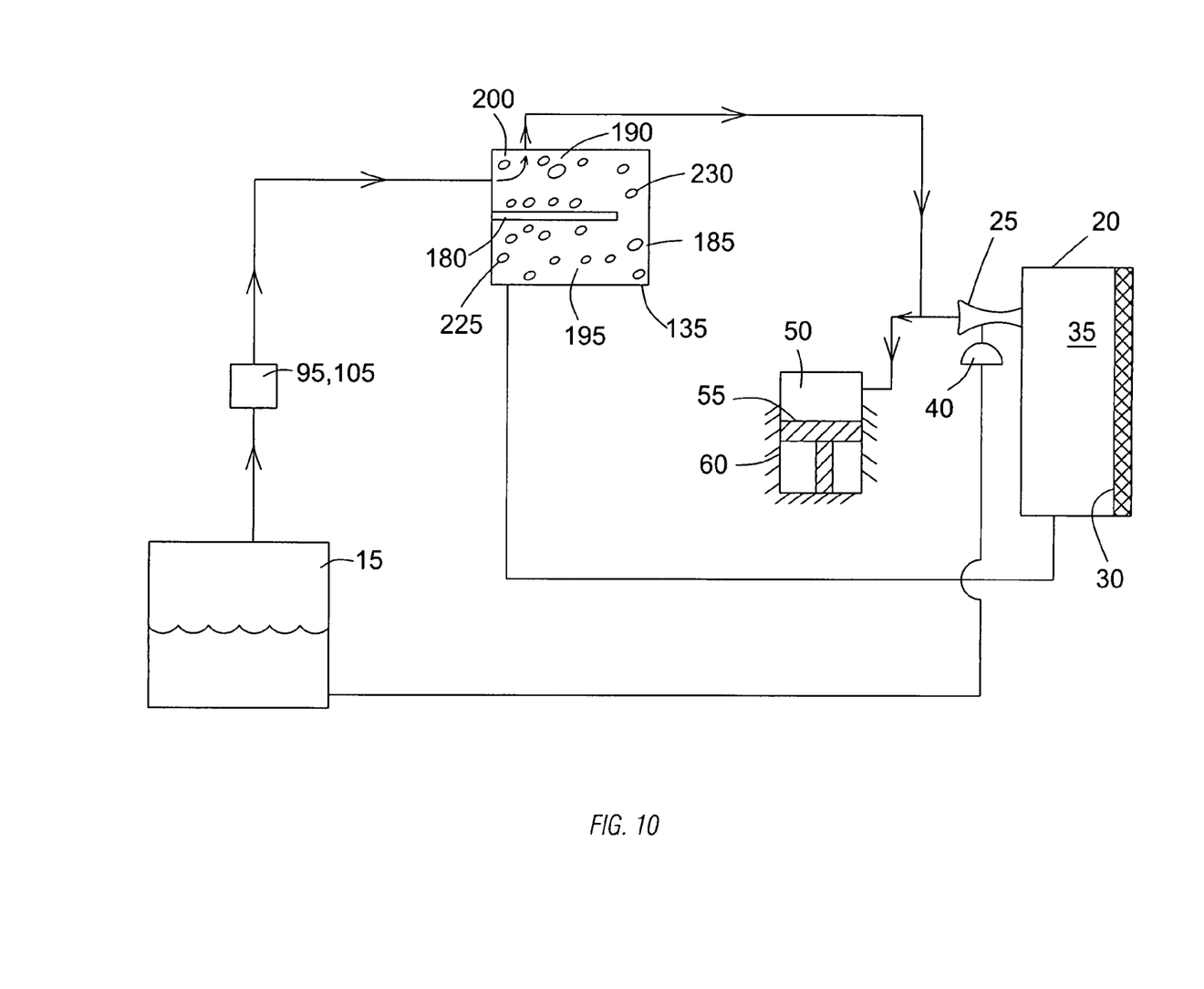
FIG. 10 is a schematic illustration of the vapor containment system during a pressure rise within the fuel tank when the engine is running.
Figure 11:
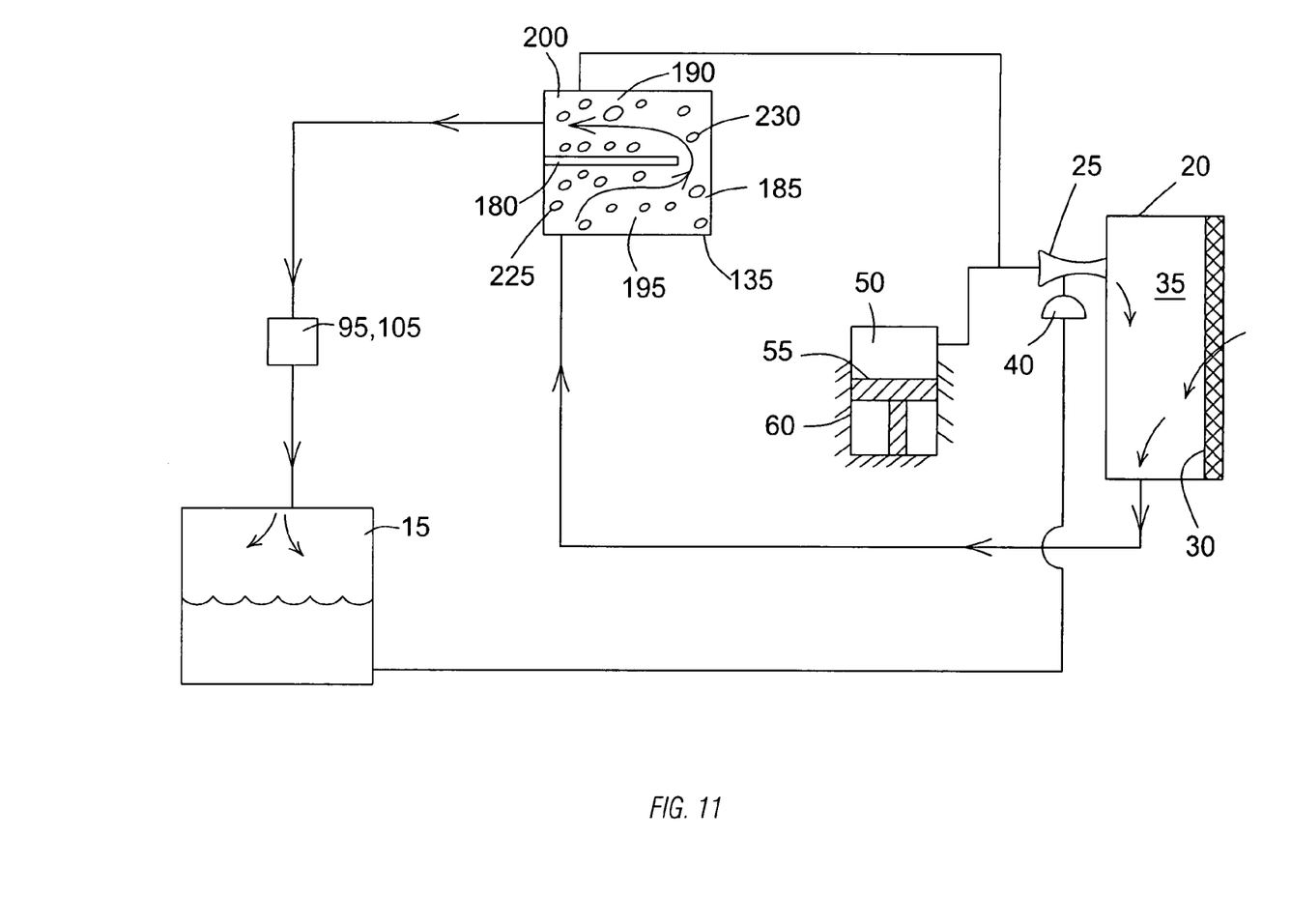
FIG. 11 is a schematic illustration of the vapor containment system during a pressure drop within the fuel tank.
Figure 12:
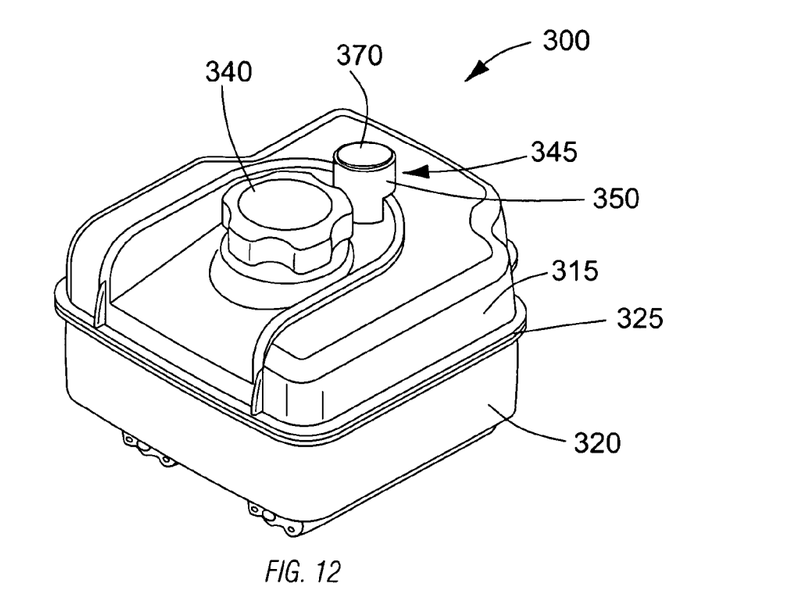
Figure 13:
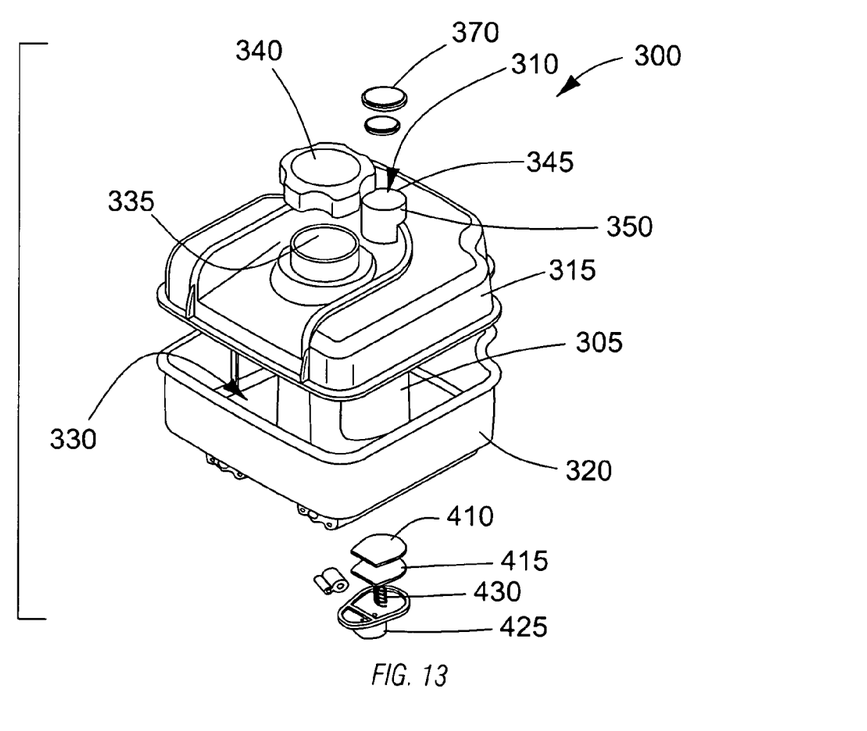
Figure 14:
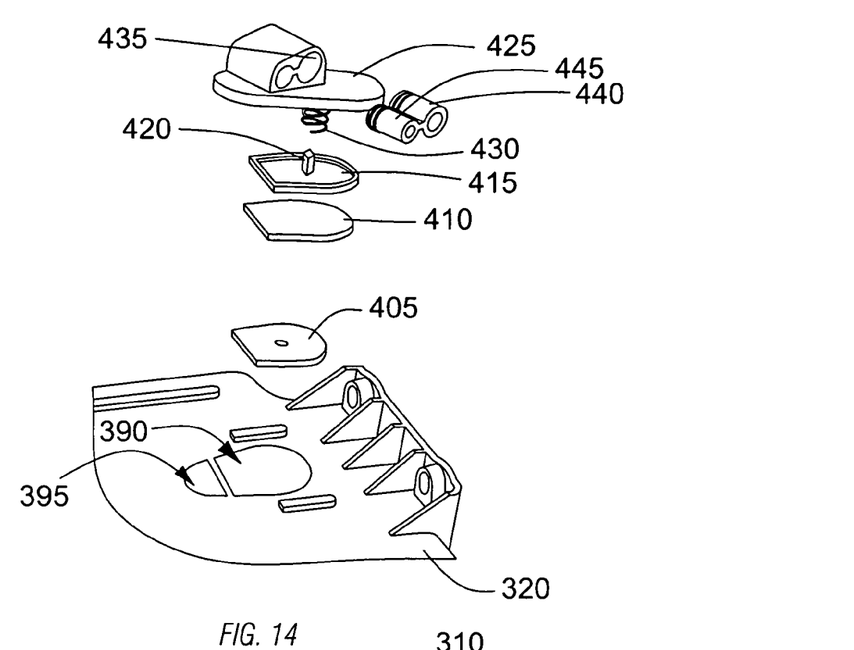
Figure 15:
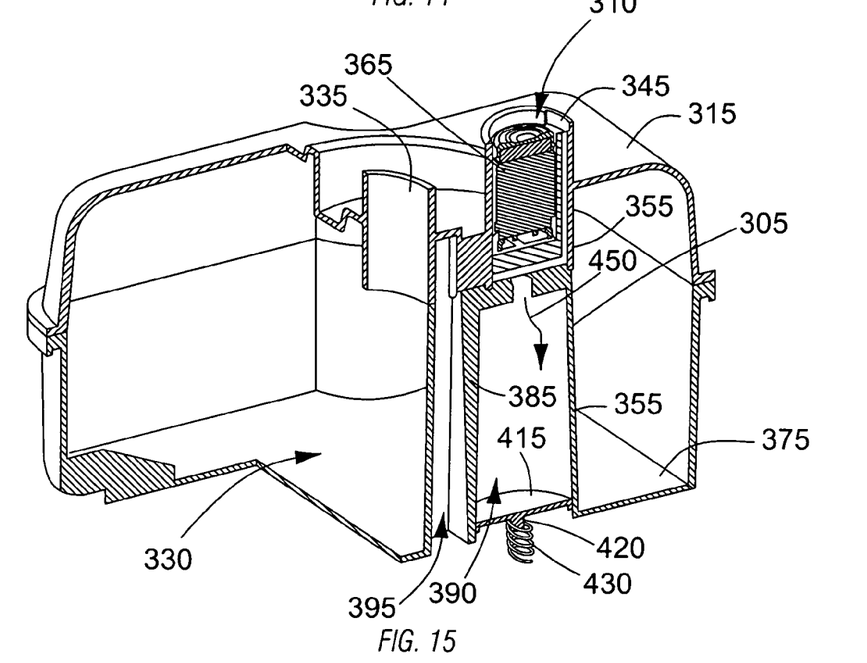
Figure 16:
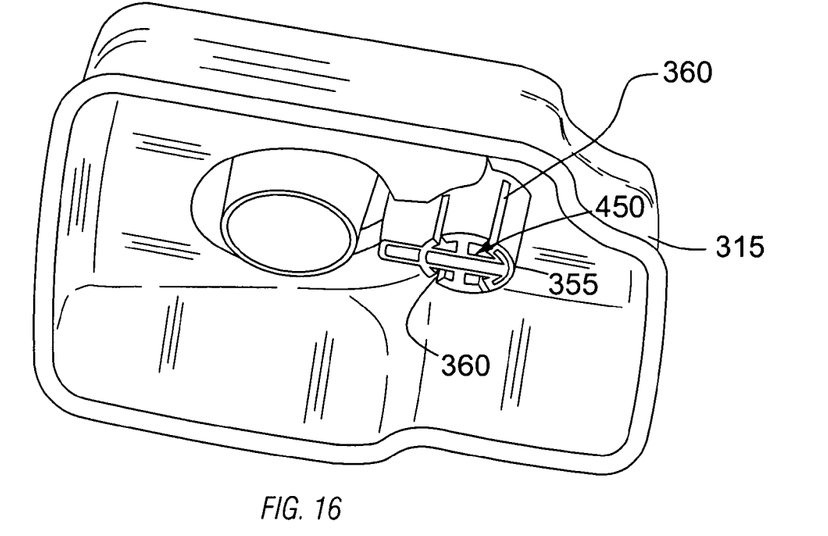

The canister space 175 is in fluid communication with three flow paths. The second end 160 of the second flow path 130, described with regard to FIGS. 3–4 and 7–8, is disposed near a first end 200 of the first leg 190. The first end 200 is opposite the bend in the U-shaped flow path 185, as illustrated in FIGS. 9–11. A third or purge flow path 205 includes a first end 210 that is positioned near the first end 200 of the first leg 190, and a fourth or vent flow path 215 includes a first end 220 that is positioned near a first end 225 of the second leg 195. Again, the first end 225 of the second leg 195 is opposite the bend in the U-shaped flow path 185, as illustrated in FIGS. 9–11. Thus, flow between the second flow path 130 and the third flow path 205 would travel a short distance along the first leg 190. However, flow between the second flow path 130 and the fourth flow path 215 must travel around a significant portion of the U-shaped flow path 185 within the canister space 175.

A filter media 230 that is suitable for use in filtering hydrocarbons is disposed within the U-shaped flow path 185. The filter media 230 adsorbs hydrocarbons, such as fuel vapor, that may be entrained in the flow that passes through the U-shaped flow path 185. One suitable filter media 230 is activated charcoal, with other types of filter media 230 also being suitable for use.

The canister space 175 includes an open end 235 that allows for access to the canister space 175 from outside of the fuel tank 15. The open end 235 allows the filter media 230 to be placed in the canister 135 after manufacturing of the fuel tank 15 is complete. A cover 240, shown in FIG. 4, is welded or adhesively bonded to the canister 135 to close the open end 235. In other constructions, fasteners or other fastening means are employed to attach the cover 240 to the open end 235.

FIG. 6 illustrates the canister 135 and portions of the third and fourth flow paths 205, 215 in section. The first end 210 of the third flow path 205 extends into the first leg 190 of the canister 135, as does the second end 160 of the second flow path 130. A passageway 245 extends from the first end 210 of the third flow path 205 to a passageway end point 250. The passageway 245 is formed as part of, or machined into, the first tank portion 65. The first end 220 of the fourth flow path 215 enters the canister 135 near the first end 225 of the second leg 195. A second passageway 255 extends from the first end 220 of the fourth flow path 215 to a second passageway end point 260. The second passageway 255 is formed as part of, or machined into, the first tank portion 65.

Figure 2:
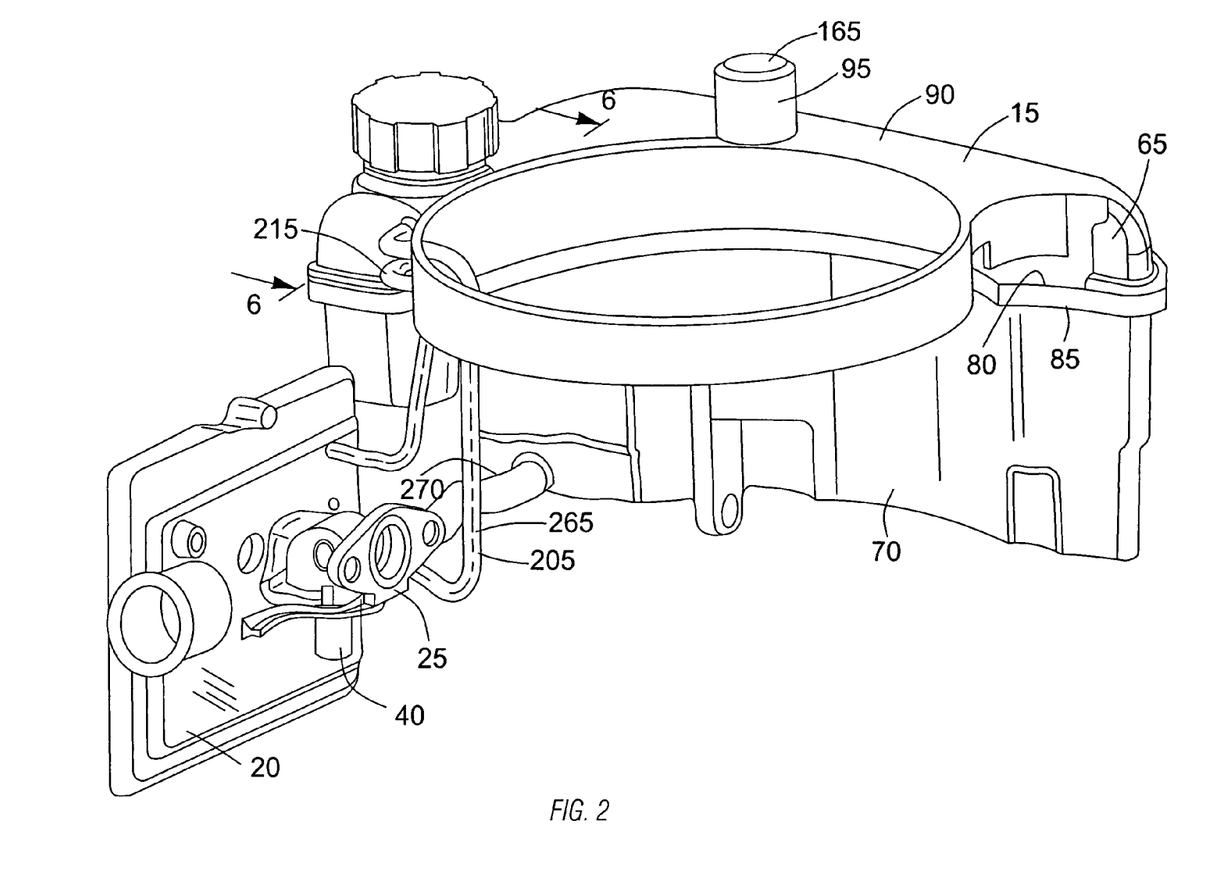
FIG. 2 is a perspective view of the fuel tank, a carburetor, and an air cleaner assembly of FIG. 1.

With reference to FIG. 2, the remainder of the third flow path 205 and the fourth flow path 215 are illustrated. A purge tube 265, or other flow-passing device, includes a first end that connects to the passageway end point 250 and facilitates the flow of fluids between the canister 135 and the carburetor 25. A second end of the purge tube 265 ends in the flow path between the carburetor 25 and the combustion chamber 50 such that, during engine operation, the second end of the purge tube 265 is generally maintained at a partial vacuum pressure. Thus, during engine operation, fluid is drawn toward the second end of the purge tube 265 along the third flow path 205.

A vent tube 270, or other flow device, includes a first end that connects to the second passageway end point 260 to facilitate the flow of fluid between the canister 135 and the air cleaner assembly 20. A second end of the vent tube 270 opens in the clean air space 35 such that fluid flowing to the air cleaner assembly 20 via the fourth flow path 215 can escape to the atmosphere. When the engine 10 is not running, the fluid enters or exits the clean air space 35. When exiting the clean air space 35 the flow passes through the filter media 30 of the air cleaner assembly 20 to enter the atmosphere.

The operation of the invention will be described with reference to FIGS. 9–11. In operation, a user fills the fuel tank 15 with fuel, usually gasoline, with other fuels also being possible. The volatility of the fuel allows some fuel to evaporate and fill the empty space within the tank 15 with a mixture of fuel vapor and air. Normal fluctuations in temperature (e.g., between the day and the evening), as well as fuel sloshing induced during use can cause an increase or a decrease in the amount of fuel vapor within the tank 15. These increases and decreases generally result in corresponding increases or decreases in pressure within the tank 15.

As shown in FIGS. 9 and 10, as the pressure within the tank 15 increases, a volatile fluid made up of fuel vapor and air enters the first flow path 110 between the fuel chamber 75 and the valve chamber 95, 105. The volatile fluid is free to pass through the valve 100 so long as the engine 10 is not tipped at an extreme angle (e.g., generally 30 degrees or greater) and the fuel chamber 75 has not been overfilled. After passing through the valve 100, the volatile fluid enters the second flow path 130 and flows to the canister 135. From the canister 135, the volatile fluid can follow two different flow paths depending on whether the engine 10 is running.

FIG. 9 illustrates the flow paths that are followed when the engine 10 is not running. The volatile fluid flows through the filter media 230 disposed along the U-shaped path 185 within the canister 135. The filter media 230 removes a substantial portion of, or all, the fuel vapor within the volatile fluid such that as the flow reaches the first end 220 of the fourth flow path 215, the flow is made up almost completely of air. The air enters the fourth flow path 215 and flows to the clean air space 35 defined by the air cleaner assembly 20. From the clean air space 35, the air can pass through the air cleaner assembly 20 to the atmosphere or can enter the carburetor 25 for combustion.

From the end of the second flow path 130, the flow can follow two possible flow paths. The first possible path, illustrated in FIG. 9, extends from the end of the second flow path 130, through the U-shaped path 185, and through the fourth flow path 215. A second possible path extends from the end of the second flow path 130, through a portion of the U-shaped flow path 185, and through the third flow path 205. It is desirable that the flow follow the first possible flow path such that the flow passes through the entire U-shaped flow path 185 and most or all of the fuel vapor is removed from the flow. If the flow of volatile fluid from the second flow path 130 followed the second possible path, the flow would bypass most of the U-shaped path 185. The volatile fluid would likely still include fuel vapor, as the flow would not pass through enough of the filter media 230 to remove all the fuel vapor. The volatile fluid, once at the carburetor 25 would be substantially free to escape from the air cleaner assembly 20, along with the fuel vapor, when the engine 10 is not running.

To increase the likelihood that the flow will follow the first possible flow path, the third flow path 205 is arranged to provide an increased flow resistance when compared to the fourth flow path 215. The flow resistance of the third flow path 205 can be increased using many suitable means, including flow restrictions (e.g., a small inlet aperture, an orifice, etc.), smaller tube diameter, longer tube length, and the like. The increased resistance of the third flow path results in a first possible flow path that has a flow resistance that is less than or equal to the flow resistance of the second possible flow path. Thus, the flow is more likely to follow the path of least resistance, which is the first possible path.

FIG. 10 illustrates the flow paths that are followed when the engine 10 is running. During engine operation, a partial vacuum is established between the carburetor 25 and the combustion chamber 50. The partial vacuum draws air and fuel into the combustion chamber 50 to facilitate engine operation. The third flow path 205 is exposed to this vacuum, thus, even with the increased flow resistance of the third flow path 205, fluid is drawn from the canister 135 along the third flow path 205. The first end 210 of the third flow path 205 is positioned such that the partial vacuum draws air from the U-shaped flow path 185. The air flow direction along the U-shaped flow path 185 is opposite the direction of flow when the engine 10 is not running. Thus, the air passes through the filter media 230 within the canister 135 and picks up hydrocarbons and fuel vapor that had been previously filtered by the filter media 230. The air, now laden with fuel vapor and combustible hydrocarbons, passes through the third flow path 205 to the carburetor 25, typically downstream of the throat, and from the carburetor 25 to the combustion chamber 50 for combustion. Thus, during engine operation, the filter media 230 is at least partially purged of captured hydrocarbons and fuel vapor. This arrangement allows the filter media 230 to remain unchanged for the life of the engine 10. Of course the arrangement of the canister 135 allows for the replacement of the filter media 230 if desired.

FIG. 11 illustrates the flow paths that are followed when the pressure within the tank 15 drops. Tank pressure can drop due to a reduction in temperature, or as a result of the removal of fuel during engine operation. To maintain the pressure within the tank 15, air or another fluid must flow into the tank 15. The fluid can be drawn through the fourth flow path 215 and/or the third flow path 205. When the fluid follows the fourth flow path 215, the clean air flows from the clean air space 35 through the U-shaped path 185. As the air passes through the U-shaped flow path 185 the air flow picks up fuel vapor that had previously been filtered by the filter media 230 to form an air/fuel vapor mixture. The air/fuel vapor mixture enters the second flow path 130, passes through the valve 100, and enters the fuel tank via the first flow path 110. Thus, fuel vapor that had been filtered by the filter media 230 is returned to the fuel tank 15.

Air can also follow the third flow path 205 to get into the canister 135. However, the increased flow resistance of the third flow path 205 as compared to the fourth flow path 215 makes it more likely that the air will enter the canister 135 via the fourth flow path 215.

Although the invention has been described in detail with reference to certain preferred embodiments, variations and modifications exist within the scope and spirit of the invention as described and defined in the following claims.

What is claimed is:

1. A fuel tank for an engine that includes an air cleaner assembly and an air-fuel mixing device, the fuel tank comprising:
    a first tank portion;
    a second tank portion connected to the first tank portion to define a fuel chamber;
    a canister at least partially formed as part of the first tank portion;
    a first flow path at least partially formed as part of the first tank portion, the first flow path providing fluid communication between the fuel chamber and the canister; and
    a second flow path at least partially formed as part of the first tank portion to provide fluid communication between the canister and at least one of the air-fuel mixing device and the air cleaner assembly.

2. The fuel tank of claim 1, further comprising a valve chamber at least partially formed as part of the first tank portion, the valve chamber defining an aperture that provides fluid communication between the valve chamber and the fuel chamber.

3. The fuel tank of claim 2, further comprising a valve disposed substantially within the valve chamber.

4. The fuel tank of claim 3, wherein the valve includes a vent valve and an overfill/tip valve.

5. The fuel tank of claim 3, wherein the valve is disposed between the aperture and the first flow path.

6. The fuel tank of claim 1, wherein the valve chamber extends above the first tank portion.

7. The fuel tank of claim 1, wherein the canister includes a canister space that is at least partially filled with a filter media.

8. The fuel tank of claim 7, wherein the filter media includes a hydrocarbon adsorbent substance.

9. The fuel tank of claim 7, wherein the canister space is substantially U-shaped and includes a first leg and a second leg.

10. The fuel tank of claim 9, wherein the first flow path provides fluid communication near a first end of the first leg portion.

11. The fuel tank of claim 10, wherein the second flow path is a vent path that provides fluid communication between the air cleaner assembly and the canister, the vent path providing fluid communication near a first end of the second leg such that fluid travels through substantially all of the U-shaped canister space to travel between the first flow path and the vent path.

12. The fuel tank of claim 10, further comprising a purge path that provides fluid communication between the canister and the air-fuel mixing device, the purge path providing fluid communication near the first end of the first leg.

13. The fuel tank of claim 12, wherein the purge path is at least partially formed as part of the first tank portion.

14. An engine comprising:
    a combustion chamber operable to combust an air-fuel mixture;
    an air-fuel mixing device operable to deliver the air-fuel mixture to the combustion chamber;
    an air cleaner assembly operable to deliver air to the air-fuel mixing device;
    a fuel tank including a wall having a top portion, the wall defining a fuel chamber;
    a valve chamber in fluid communication with the fuel chamber;
    a canister at least partially formed as part of the wall and in fluid communication with the valve chamber;
    a purge passageway at least partially formed as part of the wall to provide fluid communication between the canister and the air-fuel mixing device; and
    a vent passageway at least partially formed as part of the wall to provide fluid communication between the canister and the air cleaner assembly.

15. The engine of claim 14, further comprising a valve disposed substantially within the valve chamber.

16. The engine of claim 15, wherein the valve includes a vent valve and an overfill/tip valve.

17. The engine of claim 15, wherein the valve is in fluid communication with the fuel chamber and the canister to control flow between the canister and the fuel chamber.

18. The engine of claim 14, wherein the canister includes a canister space that is at least partially filled with a filter media.

19. The engine of claim 18, wherein the filter media includes a hydrocarbon adsorbent substance.

20. The engine of claim 18, wherein the canister space is substantially U-shaped and includes a first leg and a second leg.

21. The engine of claim 20, further comprising an aperture disposed near a first end of the first leg, the aperture providing fluid communication between the canister and the valve chamber.

22. The engine of claim 21, wherein the vent passageway provides fluid communication with the canister near a first end of the second leg, the first end of the second leg positioned such that fluid travels through substantially all of the U-shaped canister space to travel between the aperture and the vent passageway.

23. The engine of claim 21, wherein the purge passageway provides fluid communication with the canister near the first end of the first leg.

24. The engine of claim 14, wherein at least a portion of the valve chamber is integrally formed as part of the top portion.

25. A fuel tank for an engine that includes an air cleaner assembly and an air-fuel mixing device, the fuel tank comprising:
   a wall including a top portion, the wall defining a fuel chamber;
   a valve chamber at least partially formed as part of the wall;
   a first fluid communication path at least partially formed as part of the wall to provide fluid communication between the fuel chamber and the valve chamber;
   a canister at least partially defining a canister space;
   a second fluid communication path positioned to provide fluid communication between the valve chamber and the canister space;
   a third fluid communication path at least partially formed as part of the wall to provide fluid communication between the canister space and the air-fuel mixing device; and
   a fourth fluid communication path at least partially formed as part of the wall to provide fluid communication between the canister space and the air cleaner assembly.

26. The fuel tank of claim 25, further comprising a valve disposed substantially within the valve chamber.

27. The fuel tank of claim 26, wherein the valve includes a vent valve and an overfill/tip valve.

28. The fuel tank of claim 26, wherein the valve is disposed between the first fluid communication path and the second fluid communication path to control flow between the canister space and the fuel chamber.

29. The fuel tank of claim 25, wherein at least a portion of the valve chamber is integrally formed as part of the wall.

30. The fuel tank of claim 25, wherein the canister space is at least partially filled with a filter media.

31. The fuel tank of claim 30, wherein the filter media includes a hydrocarbon adsorbent substance.

32. The fuel tank of claim 25, wherein the canister space is substantially U-shaped and includes a first leg and a second leg.

33. The fuel tank of claim 32, wherein the second fluid communication path provides fluid communication near a first end of the first leg portion.

34. The fuel tank of claim 33, wherein the fourth fluid communication path provides fluid communication near a first end of the second leg such that fluid travels through substantially all of the U-shaped canister space to travel between the second fluid communication path and the fourth fluid communication path.

35. The fuel tank of claim 33, wherein the third fluid communication flow path provides fluid communication near the first end of the first leg.

36. The fuel tank of claim 25, wherein at least a portion of the canister is integrally formed as part of the wall.

37. The fuel tank of claim 25, wherein the canister includes an opening that provides access to the canister space from outside of the fuel tank when the fuel tank is assembled.

38. The fuel tank of claim 37, further comprising a cover attached to the canister to sealably cover the opening.

* * * * *